United States Patent [19]

Sundberg

[11] Patent Number: 5,501,978
[45] Date of Patent: *Mar. 26, 1996

[54] AERATION DRUM FOR COMPOSTING TOILET

[76] Inventor: Henric Sundberg, Burlington, Canada

[ * ] Notice: The term of this patent shall not extend beyond the expiration date of Pat. No. 5,345,620.

[21] Appl. No.: 252,467

[22] Filed: Jun. 1, 1994

Related U.S. Application Data

[63] Continuation-in-part of Ser. No. 37,756, Mar. 26, 1993, Pat. No. 5,345,620.

[51] Int. Cl.$^6$ .............................. C12M 1/10; C12M 1/06
[52] U.S. Cl. ........................ 435/290.3; 4/449; 366/228; 435/290.4
[58] Field of Search ..................... 435/287, 312, 435/316, 313, 315; 422/184, 209; 4/111.1, 111.5, 111.6, 449, DIG. 12, DIG. 19; 366/57, 187, 225, 228; 34/108, 109; 71/9

[56] References Cited

U.S. PATENT DOCUMENTS

| 885,813 | 4/1908 | Warner | 366/187 |
|---|---|---|---|
| 930,319 | 8/1909 | Short | 4/DIG. 12 |
| 3,676,074 | 7/1972 | Shibayama et al. | 435/312 |
| 3,845,939 | 11/1974 | Waldenville | 435/312 |
| 3,859,672 | 1/1975 | Modig | 4/DIG. 12 |
| 3,890,129 | 6/1975 | Chester | 71/9 |
| 3,921,228 | 11/1975 | Sundberg | 4/DIG. 12 |
| 4,633,535 | 1/1987 | Louvo | 4/449 |
| 4,933,073 | 6/1990 | Jonkers et al. | 209/284 |
| 5,104,232 | 4/1992 | Lennox | 366/227 |
| 5,171,690 | 12/1992 | Yiosjoki | 435/312 |
| 5,254,472 | 10/1993 | Brooks et al. | 435/312 |
| 5,303,431 | 4/1994 | Johansson | 4/449 |
| 5,345,620 | 9/1994 | Sundberg | 4/449 |

FOREIGN PATENT DOCUMENTS

| 2494715 | 5/1982 | France | 435/312 |
|---|---|---|---|
| 2598705 | 11/1987 | France | 435/312 |
| 1226786 | 9/1989 | Japan | 435/312 |

Primary Examiner—William H. Beisner

[57] ABSTRACT

An aeration drum is rotatably-mounted for rotation about a longitudinal axis oriented horizontally inside a housing which has an air inlet and air outlet for venting the unit. A removable receptacle receives decomposed solid waste matter from the aeration drum for periodic removal from the unit. The aeration drum has a narrow end, and a wide end extending radially outwardly from the narrow end. In a preferred construction of the aeration drum, the narrow end has a constant diameter over a short length of the drum and the wide end has a constant diameter over a greater length of the drum. A perforated collar on an intermediate portion of the drum between the narrow end and the wide end allows liquid to drain from the narrow end into the wide end while retaining the solid waste in the narrow end where it decomposes. The wide end has a liquid discharge in fluid communication with the housing and the narrow end has a solid waste discharge for radial discharge into the receptacle. The configuration of the drum defines a bottom surface at the wide end which is always lower than at the narrow end of the drum thereby improving the separation of liquid waste from solid waste.

9 Claims, 6 Drawing Sheets

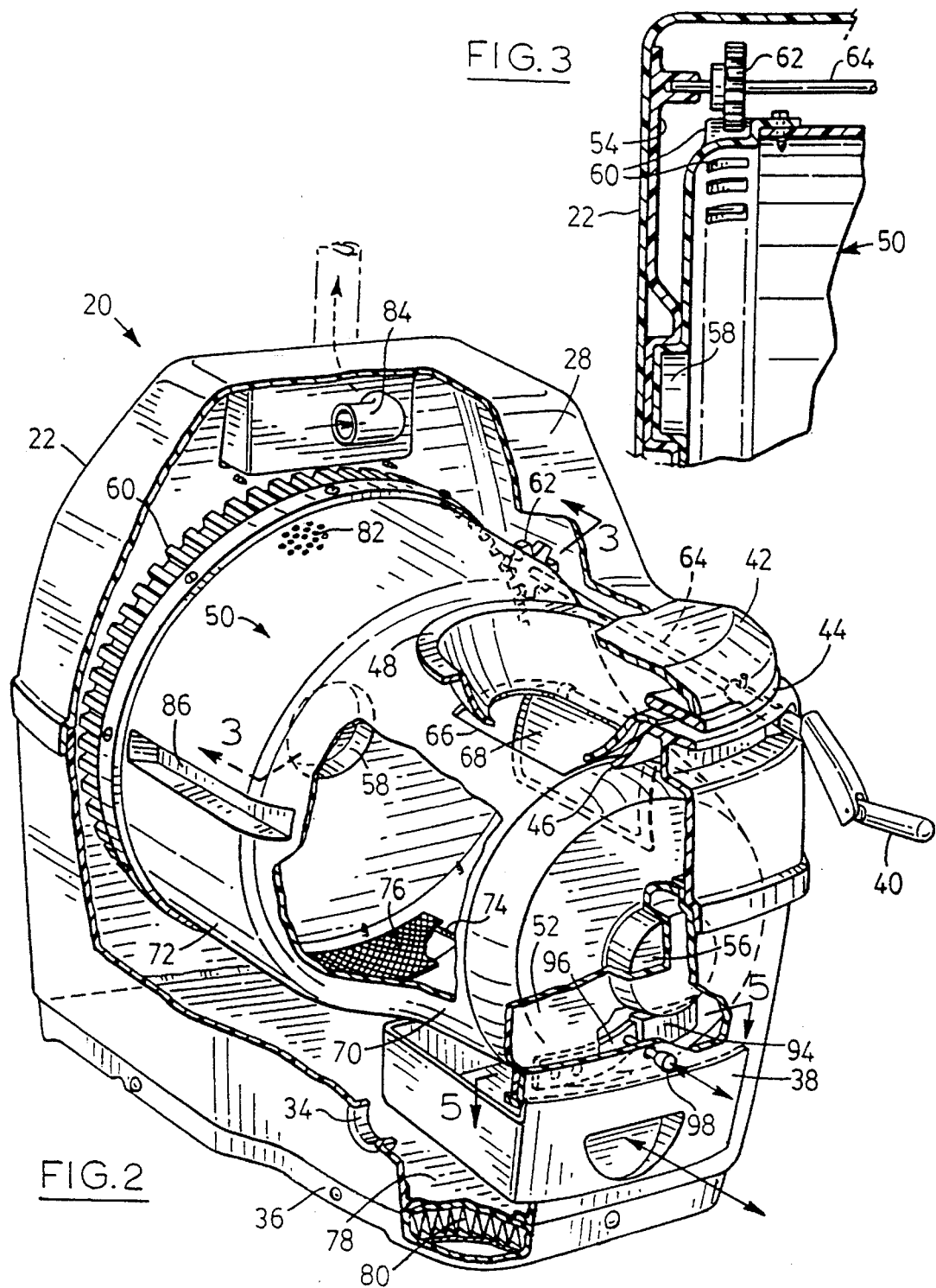

AERATION DRUM FOR COMPOSTING TOILET

CROSS REFERENCE TO RELATED APPLICATION

This application is a continuation-in-part of prior application Ser. No. 08/037,756, filed on Mar. 26, 1993, U.S. Pat. No. 5,345,620.

FIELD OF THE INVENTION

This invention relates to composting toilets. In particular, the invention is directed to improvements to an aeration drum used in composting toilets for aeration of the decomposing waste and mixing the waste with added organic matter.

BACKGROUND TO THE INVENTION

Composting toilets use the natural processes of decomposition and evaporation to recycle human waste. The toilets do not require any septic systems, holding tanks, or chemicals, and can be installed easily in remote locations, isolated areas like islands and rocky sites without fear of contaminating the environment. In order for the toilets to transform human waste into good fertilizing soil, the liquid waste is separated from the solid waste and, optionally, heated to supplement the heat generated during decomposition of the solid waste so that it will evaporate. The solid waste is aerated and supplemented with organic material which conveniently will comprise peat moss or kitchen scraps.

In order that a composting toilet will operate without any offensive odours, it is important to provide a good liquid drain and to flow fresh air through the toilet so as to vent the toilet and to entrain water vapour originating in the waste entering the toilet. A fresh supply of oxygen also assists in a fast, odourless, aerobic breakdown of the solid material to transform it into an inoffensive earth-like substance.

Modern composting toilets include an aeration drum to provide superior aeration and mixing of the waste material. In order to provide sufficient capacity for average residential or cottage use, aeration drums are typically constructed from cylinders having a diameter of 46 centimetres (18 inches) and disposed horizontally for rotation about their longitudinal axis. Normally a toilet seat and bowl are disposed above the aeration drum and a drawer is provided beneath the drum for the periodic removal of decomposed solid waste matter. The aggregate height of the drawer, drum, and toilet bowl and seat result in a unit where the distance separating the seat from the floor far exceeds a comfortable height for seating an average person. An object of this invention is to provide means to improve venting in a composting toilet so as to further minimize the opportunity for any noxious odours to escape from the toilet and to provide a more convenient and cosmetically-appealing unit.

Another object of the invention is to improve the separation of liquid waste from solid waste.

SUMMARY OF THE INVENTION

In accordance with this invention, there is provided an aeration drum for use in a composting unit. The drum is rotatably-mounted for rotation about a longitudinal axis inside a housing and has a narrow end and a wide end extending radially outwardly from the front end. The wide end has liquid discharge means in fluid communication with the housing and the narrow end has solid waste discharge means.

The configuration of the aeration drum is adapted to collect and drain liquid away from the narrow front end and thereby define a compartment for wet decomposition and a compartment for drier decomposition in the wide end and the narrow end respectively.

BRIEF DESCRIPTION OF THE DRAWINGS

A preferred embodiment of the invention will now be described with reference to the following drawings, in which:

FIG. 2 is a similar view to FIG. 1, partly broken away to reveal the component parts of the composting toilet;

FIG. 3 is a partly sectioned view taken on line 3—3 of FIG. 2 showing the association between an aeration drum and a housing for the toilet at a rear end thereof;

DESCRIPTION OF THE INVENTION WITH REFERENCE TO THE DRAWINGS

Figure 1:
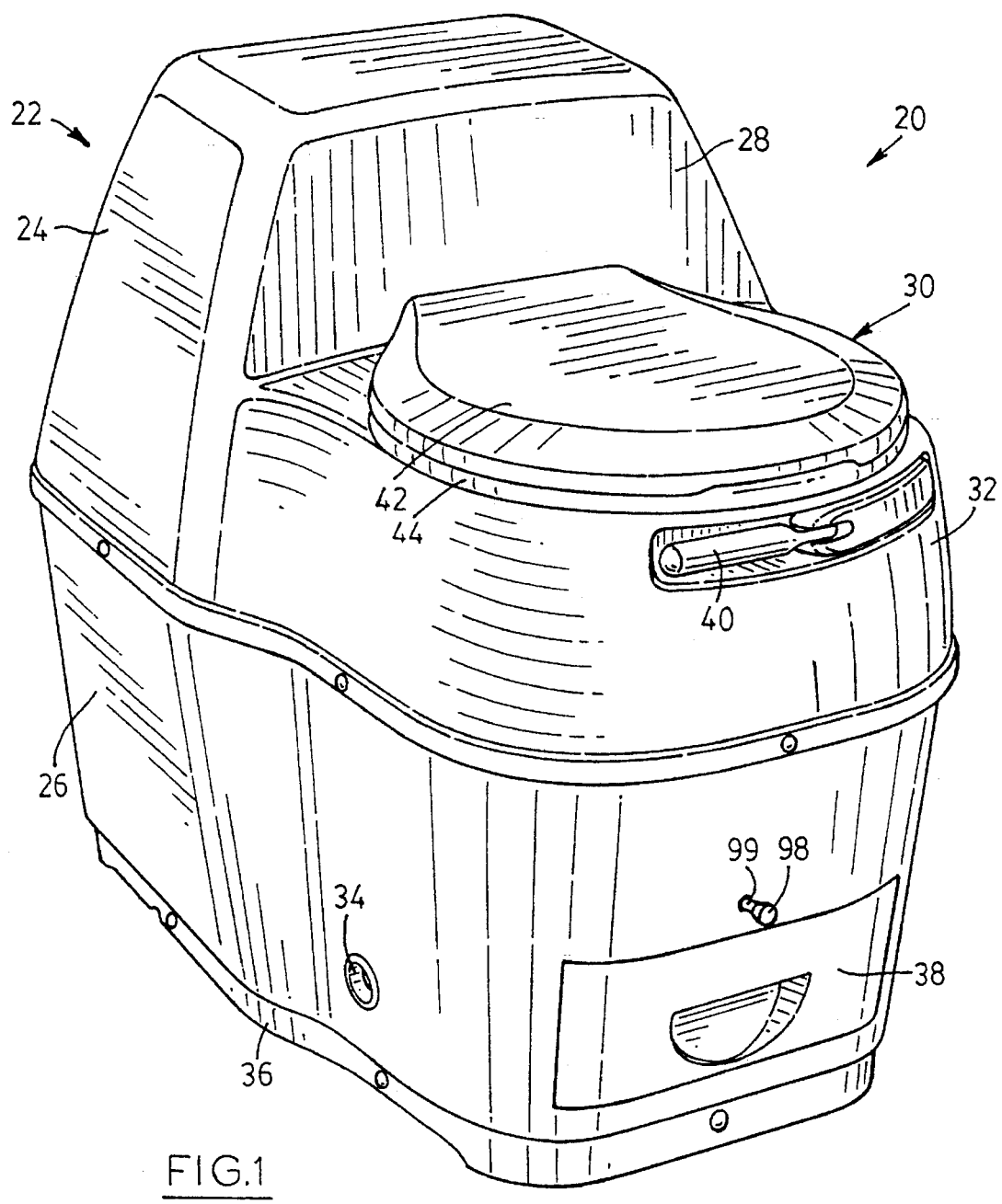
FIG. 1 is a perspective view from the front showing a composting toilet in accordance with the invention.

A composting toilet made in accordance with the invention is generally indicated by Numeral (20) in FIG. 1. A housing (22) comprising an upper portion (24) fitted to a lower portion (26) and made from fibreglass material conceal most of the operating components from view. It will be appreciated that the upper portion of the housing has an upwardly-extending rear portion (28) disposed behind a seat portion (30) and extending above the seat portion in conventional fashion. Furthermore, the seat portion (30) is disposed on a front portion (32) of the housing which is narrower in width than the rear portion (28) so that the composting toilet resembles a conventional flush toilet having a unitary body.

Other features of the composting toilet (20) apparent from FIG. 1 include an aeration hole (34) formed in a side wall of the housing (22) at the front of the toilet (20) and upwardly spaced from a floor (36) comprising the housing (22). The front face of a drawer (38) accessible from the front of the toilet (20) and upwardly spaced from the floor (36) can also be seen in FIG. 1. Finally, FIG. 1 shows a handle (40) which is shown disposed in its stored configuration inside a recess provided in a front face of the upper portion of the housing adjacent the seat portion (30).

The component parts of the composting toilet (20) will now be described with reference to FIG. 2. It will be seen that the seat portion (30) comprises a lid (42) hinged to a seat (44) and disposed about an opening (46) in the housing which is lined with a bowl (48).

An aeration drum (50) extends longitudinally between the front and rear portions of the housing (22) which are lined with respective inner wall portions (52), (54) (FIG. 3). The inner wall portions (52), (54) are shaped to receive and support a front boss (56) and a rear boss (58) extending outwardly from the drum (50) about the longitudinal axis of the drum and rotatably coupled to the associated inner wall portions (52), (54). The rear portion of the drum (50) has a cogged circumference (60) engaged by a pinion wheel (62) disposed to one side of the housing and mounted on a shaft (64) rotatably mounted between the back wall lining (54) of the housing (22) and the front of the housing where it terminates in the handle (40).

Figure 9:
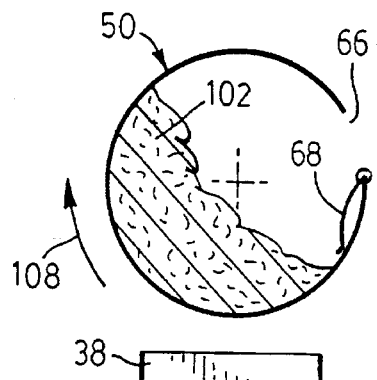
FIG. 9 is a similar view to FIG. 7, with the aeration drum rotated approximately 120 degrees clockwise from the position in FIG. 6.
Figure 10:
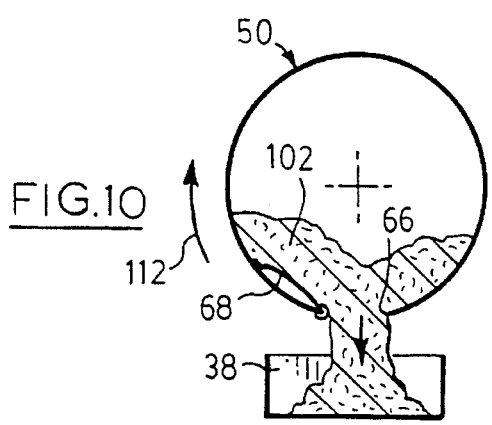
FIG. 10 is a similar view to FIG. 9 with the aeration drum rotated clockwise a further 100 degrees.

Waste access means are defined in the aeration drum (50) by an opening (66) associated with a door (68) hinged to the drum (50) for suspension inside the drum. As will become apparent from FIGS. 7, 9 and 10, the door (68) is adapted to close the opening (66) when the drum is rotated in one direction and to free the opening when rotated in the opposite direction. In the normal orientation as drawn in FIG. 1, the opening (66) will align with the bowl (48) so that human waste matter discharged into the toilet will be received in the drum (50).

It will be noted that the aeration drum has a narrow front end (70) and a wide rear end (72) which extends radially outwardly from the front end. The narrow end has a substantially constant diameter over a predetermined length which, in the drawings, correspond to a length required to accommodate the seat (30). The diameter increases gradually toward the rear of the toilet because of moulding considerations and this feature is exaggerated in the drawings for illustration purposes. Similarly, the wide end has a substantially constant diameter (greater than the diameter of the narrow end). The wide end is longer than the narrow end to which it is connected with an intermediate portion of variable diameter and relatively narrow length. The front end (70) accommodates the waste access means, the opening (66), and is disposed to lie above the drawer (38) into which relatively dry decomposing solid waste is periodically discharged and held for a period of two to three weeks prior to removal from the composting toilet.

The rear end (72) has an opening (74) diametrically opposite the waste access means (66) and covered with a mesh (76) of expanded stainless steel for the discharge of liquid matter from the drum (50) onto the floor (36) of the housing (22). The floor (36) has a false bottom (78) which conceals a heating element (80) that supplements heat generated during composting for the evaporation of liquid discharged through the mesh (76).

A plurality of perforations (82) in the aeration drum (50) define gas outlet means and are disposed opposite the mesh (76) on the same side of the drum longitudinal axis as the waste access means (66). The perforations (82) are adapted to cause an airflow through the composting solid waste and allow gases to escape from the drum (50) so as to be aspirated into a vent pipe (84) arranged in the rear portion (28) of the housing (22) and disposed to vent gases to a location remote from the toilet (20). A pair of diametrically-opposed ribs or paddles (86) extend radially inwardly from the wall of the drum (50) along the length of the rear end (72) to assist in lifting solid waste matter during rotation of the drum.

Figure 4:
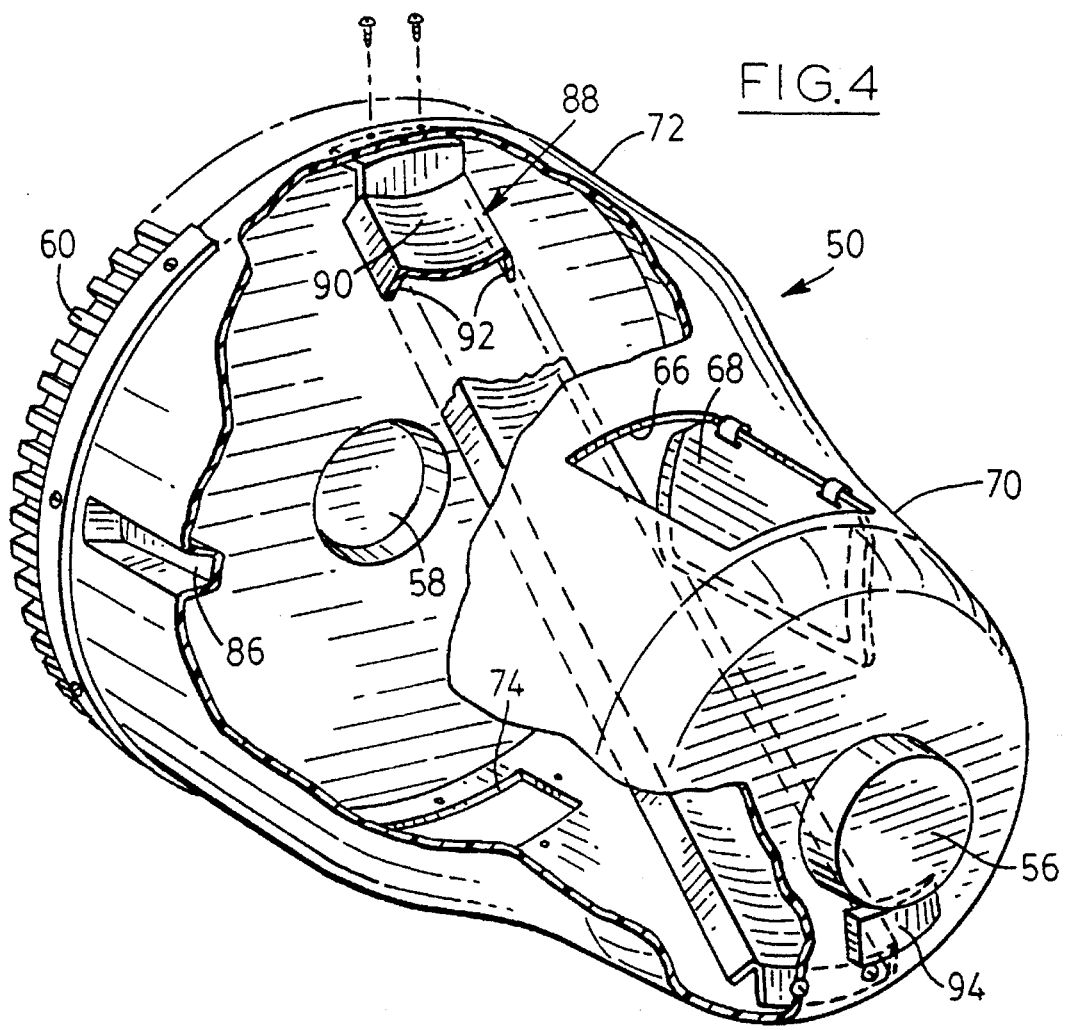
FIG. 4 is a partially broken-away perspective view of an aeration drum for a composting toilet in accordance with the invention.

To provide for still better mixing, the aeration drum (50) includes a chute (88) (FIG. 4) mounted at one end to the rear end of the drum (50) and at the other end to the front of the drum diametrically opposite to the rear-mounted end. The chute (88) has a concave surface (90) extending along the length thereof and a pair of retaining lips (92) disposed to extend outwardly from the opposite (convex) surface of the chute (88).

The aeration drum (50) also includes stop means in the form of a wedge (94) disposed on the front outside face of the drum so as to extend between the drum (50) and the housing (22). An interference means in the form of a flexible pawl (96) is mounted to the interior surface of the front wall lining (52) adjacent the housing (22) and is retractable away from the path of movement of the wedge (94) (FIG. 5) by means of a knob (98). The knob (98) is mounted to a stem (99) attached at one end to the pawl (96) and which penetrates the front wall lining (52) and the housing (22) so that the knob (98) is accessible from outside the toilet (20).

In use, any solid waste matter is supplemented with organic material conveniently provided in the form of peat moss or kitchen waste. Approximately 90% of the waste matter discharged into the toilet (20) through normal use is liquid which will drain away from the front end (70) of the aeration drum (50) towards the rear end (72) which, because of its greater radial width, has a bottom surface which is always disposed below the bottom surface of the front end (70) and therefore is adapted to improve the separation of liquid waste from the solid waste. The liquid also will flow to cover the full length of the wide end thereby keeping the decomposing solid waste evenly moist. Liquid is discharged from the drum (50) through the mesh (76) where it collects on the false bottom (78) of the floor (36) and is evaporated and vented outside the composting toilet by an airflow between the air inlet (34) and vent pipe (84). If desired, this flow may be augmented by means of a fan mounted adjacent the vent pipe (84) at the rear of the composting toilet (22).

Any water vapour inside the aeration drum (50) and other waste gases will collect in the rear end (72) above the height of the seat portion (30) so that they will not offend the user of the toilet. The perforations (82) provided at the rear end (72) will allow the collected gases to escape from the aeration drum (50) and be vented up the vent pipe (84).

Figure 7:
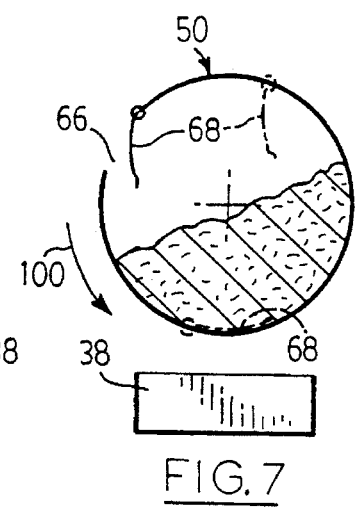
FIG. 7 is a cross-sectional view taken on line 7—7 of FIG. 6 with the aeration drum partially rotated in a counter-clockwise direction.

On a regular basis, the handle (40) is turned so as to rotate the aeration drum (50) in a counter-clockwise direction as indicated by arrow (100) in FIG. 7. The door (68) is mounted so that it will pivot to close the drum opening (66). Any solid waste matter (102) in the aeration drum (50) will tumble and be mixed. In practice, the aeration drum (50) will not be more than 50–60% full. During such rotation of the drum (50), it will be appreciated that the paddles or ribs (86) will operate to improve such mixing by lifting solid matter resting thereon (FIG. 8).

Figure 6:
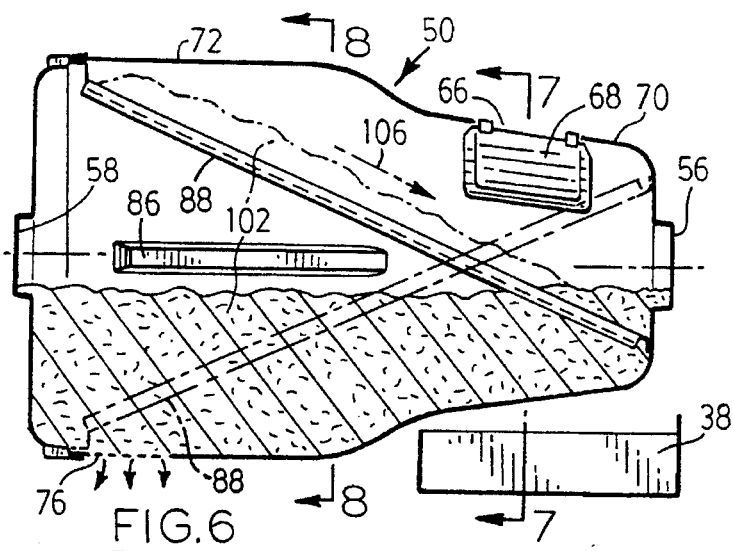
FIG. 6 is a schematic side elevation of the aeration drum of FIG. 4 and an associated drawer.
Figure 8:
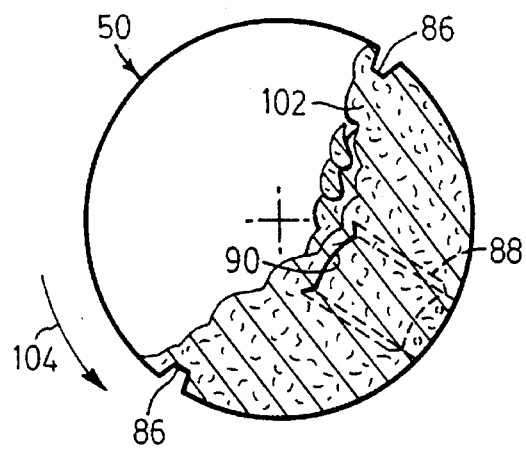
FIG. 8 is a cross-sectional view taken on line 8—8 of FIG. 6 with the aeration drum rotated approximately 240 degrees counter-clockwise.

Continued counter-clockwise rotation of the drum (50) as indicated by arrow (104) in FIG. 8 will bring the rearmost end of the chute (88) into the tumbling solid matter (102) and such matter will be retained on the concave surface (90) of the chute (88) as the drum (50) continues to rotate. Because the chute (88) is mounted so that its rear end is diametrically opposite its front end, any solid matter lying on the concave surface (90) will slide forwardly as indicated by arrow (106) in FIG. 6, thereby bringing forward decomposing material from the rear end of the drum (50).

The lips (92) extending from the opposite surface of the chute (88) likewise serve to contain solid waste matter on the chute at the front end thereof so that the chute operates to direct solid waste matter from the front of the drum (50) towards its centre thereby ensuring that no "dead pockets" of undisturbed matter will accumulate at the front of the drum (50).

Figure 5:
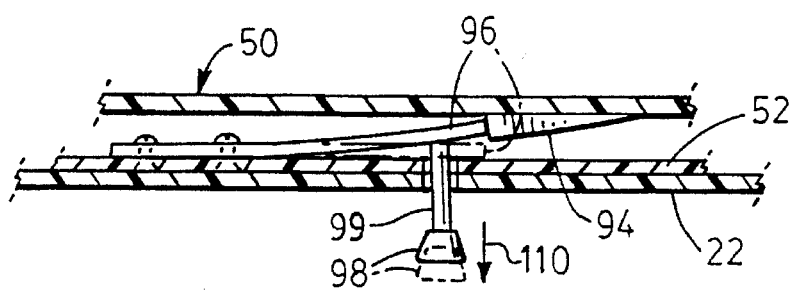
FIG. 5 is a cross-sectional view taken on line 5—5 of FIG. 2 showing stop means for arresting motion between the aeration drum and the housing of the composting toilet.

Referring now to FIG. 5, it will be seen that the stop (94) is engaged by the pawl (96) which operates to obstruct rotational movement of the drum in a clockwise direction in normal use. If it is desired to rotate the drum (50) in a clockwise direction as inflicted by arrow (108) in FIG. 9, the pawl (96) is moved out of the path of movement by pulling on the knob (98) as indicated by arrow (110) so as to bring the pawl to the position shown in ghost outline in FIG. 5.

Continued clockwise rotation of the drum (50) as indicated by arrow (112) will cause the door (68) to the drum opening (66) to reside in an open configuration and will allow waste matter (102) to be discharged in a radial direction through the opening (66) into the collection drawer (38) (FIG. 10) beneath the narrow end of the drum. The decomposing solid waste collected in the drawer (38) is held for a period of two to three weeks for final composting and may then be disposed of safely for garden use. Such removal of decomposed solid waste from the aeration drum (50) is required only infrequently, typically about every 2–3 months for a toilet serving a family of four on a day-to-day basis.

It will thus be appreciated that the pawl (96) and stop (94) arrangement shown in FIG. 5 operates to prevent the accidental discharge of waste matter into the drawer (38) resulting from inadvertent rotation of the drum in a clockwise direction.

Several variations may be made to the above-described embodiment of the invention within the scope of the appended claims. In particular, it will be noted that the aeration drum in accordance with the invention need not incorporate a chute of the kind identified by reference No. (88) in the above-mentioned description. Other obvious changes within expected skill would include the optional use of the heater element (80) which itself may take several configurations, and of an electric fan to augment air flow through the toilet unit. Many other expedients may also be used for rotatably mounting the aeration drum within the housing and such features have been described merely as exemplary features enabling those skilled in the art to make the invention claimed.

Finally, it will be appreciated that the configuration of the aeration drum provides enormous advantages over the prior art. The advantages are three-fold: optional height reduction at the narrow end whereby the toilet seat may be lowered for convenient access; improved venting of gases to the wide end away from the seat area; and improved separation of liquid waste from solid decomposed waste. The first-mentioned feature of allowing the seat located at the front of the toilet to be lower and more conveniently accessible is of great practical significance in that the toilet may be constructed to more closely resemble a conventional flush toilet and this, of course, is a feature which facilitates acceptability of the product in the market. It will be appreciated that this feature is a direct result of fabricating the aeration drum with a narrow end disposed at the front of the toilet so that the seat may be accommodated in a space which would otherwise be occupied by the aeration drum.

As gases will inevitably rise to the highest point, the configuration of the drum will furthermore improve the venting of the toilet as the gases will tend to collect in the wide higher end removed from the seat area. Conversely, liquid waste will tend to drain towards the lowest point away from the narrow end thereby improving the separation of liquid waste from solid waste.

Figure 11:
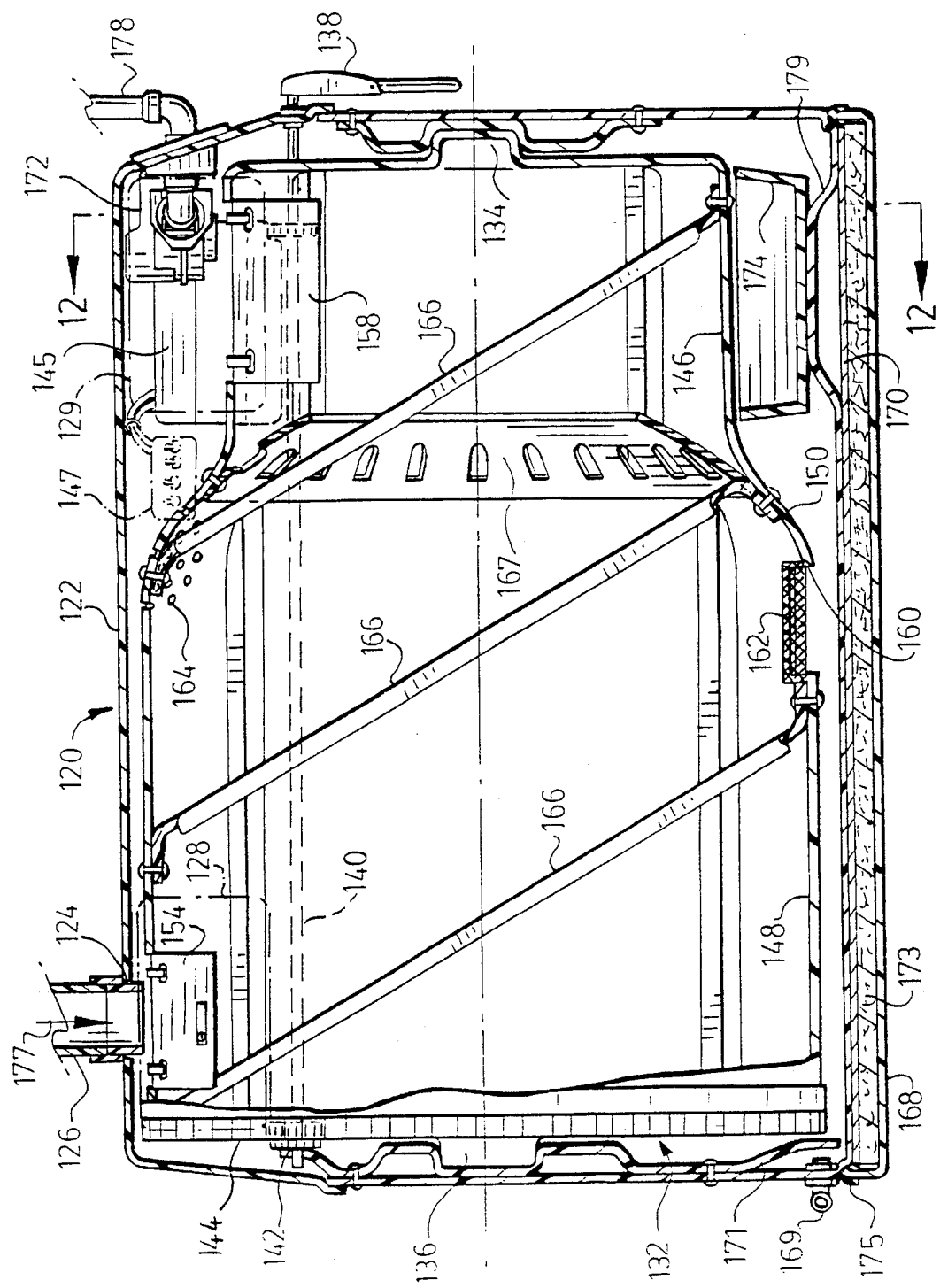
FIG. 11 is a cross-sectional view of an alternative embodiment of the invention showing a composting unit.
Figure 12:
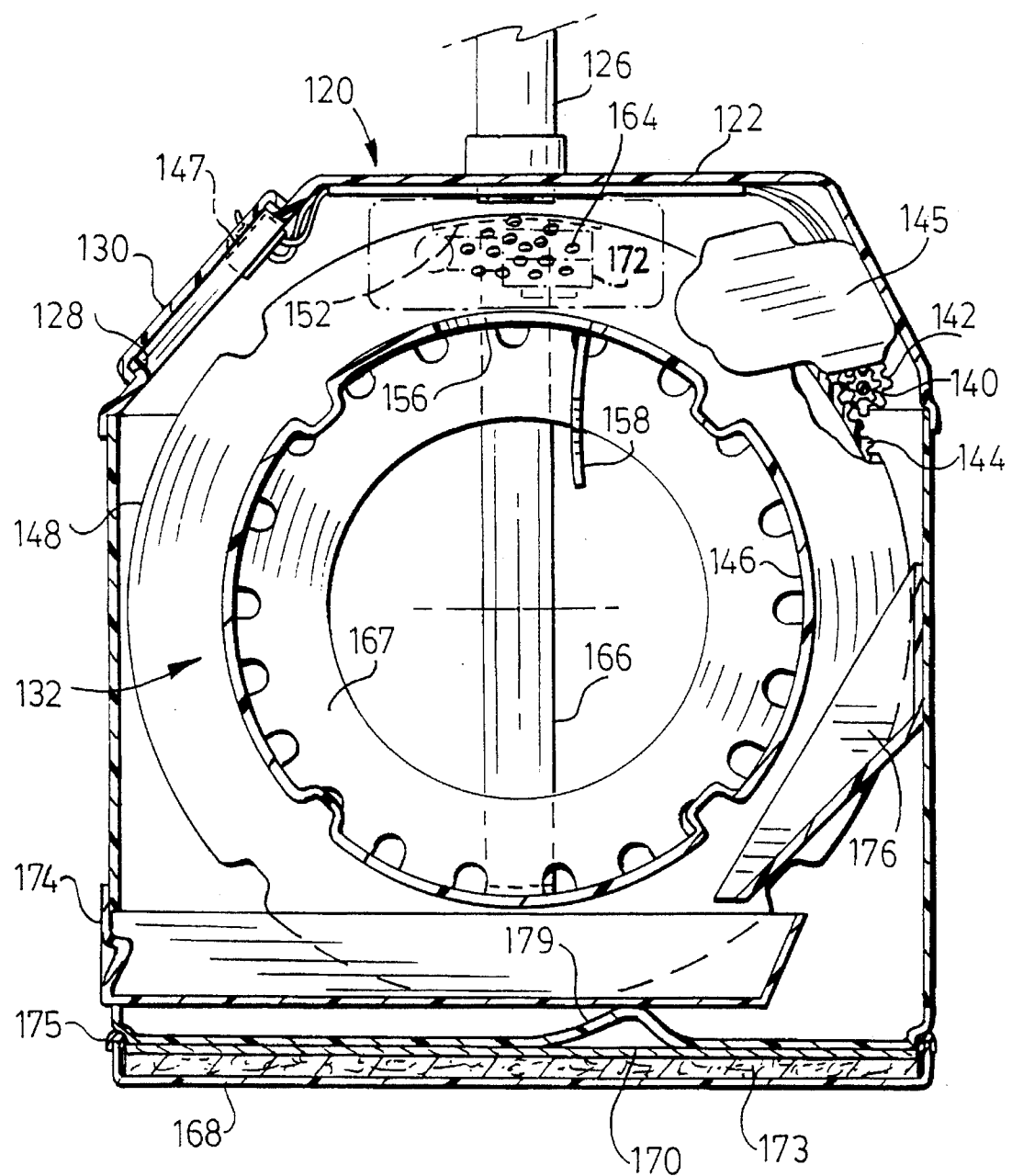
FIG. 12 is a cross-sectional view taken on line 12—12 of FIG. 11.

The advantageous separation of liquid waste from solid waste will manifest itself in any composting unit which includes an aeration drum in accordance with the invention as exemplified in an alternative embodiment of the invention drawn in FIGS. 11 and 12.

A composting unit (120) is shown in which a housing (122) has waste access means which comprise an opening (124) to receive a pipe (126) and a first hatch (128) having a cover (130) at one end and a second hatch (129) and cover (131) (not shown) at the other end.

An aeration drum (132) is rotatably mounted for rotation about a longitudinal axis thereof inside the housing (122) with first and second outwardly extending bosses (134,136) which nest inside cooperating wall portions of the housing. The drum is rotated by means of a handle (138) accessible outside the housing and fixed to a shaft (140) which terminates in a pinion wheel (142) which engages a cogged circumference (144) of the housing. In this portion of the drawing of FIG. 11, the housing is drawn unsectioned for clarity of illustration.

A motor (145) is provided to rotate the drum (132) where a source of electricity is readily available and, conveniently, the motor may be coupled to a controller (147) for automatic operation in accordance with a predetermined schedule.

The aeration drum (132) is characterized by a narrow first end (146) having a substantially constant first diameter, typically 100 cm, and a wide second end (148) having a substantially constant second diameter exceeding said first diameter, typically 130 cm. An intermediate portion (150) of variable diameter is disposed between the narrow end (146) and the wide end (148).

The wide end (148) has a waste access means in the form of an opening (152) having a hinged flap (154) which may be locked to a closed configuration while the narrow end (146) has solid waste discharge means in the form of a respective opening (156) and hinged flap (158). The openings (152,156) are accessible from the housing through the hatch (128) and the hatch (129) respectively.

Liquid waste discharge means are provided at the wide end (148) diametrically opposite the opening (152) in the form of an opening (160) covered by an expanded metal mesh (162). Preferably, the opening (160) is not in the direct path of movement below the waste inlet opening (152) and is longitudinally spaced therefrom so as to be adjacent to the intermediate portion (150).

Venting perforations (164) are provided in the aeration drum (132) in the intermediate portion (150) and are disposed on the same side of the longitudinal axis of the drum as the waste inlet opening (152).

Three chutes (166) are mounted to the interior of the housing with one end fixed to the wide end (148) and extending toward the narrow end (146) where they are fixed diametrically opposite to the other end. The chutes aid in mixing the waste as described earlier and move the solid waste toward the narrow end during rotation of the drum.

The drier decomposing waste tends to move more easily and is concentrated at the narrow end (146). A perforated collar (167) disposed in the intermediate portion projects into the narrow end and constitutes a physical barrier to retain the decomposing drier waste in the narrow end (146)

and permits liquid to drain through the perforations into the wide end (148). Any residual liquid in the waste is collected at the wide end where it eventually drains out of the housing through the mesh (162). Significant accumulations of liquid may be drained from the housing at a spigot (169) which is shielded from obstruction by any large particles through a baffle extension (171) of the housing wall. To assist evaporation, the floor of the housing has a false bottom (168) with a heating element (170) sandwiched between the housing (122) and a layer of insulation (173). A rubber seal (175) bridges the gap between the housing (122) and the false bottom (168).

Vapours exit the aeration drum (132) via the vents (164) and the waste inlet and outlet openings (152,154) and exit the housing (132) with the aid of an electric fan (172) disposed above the narrow end (146) and communicating with air outlet means (178). In a non-electric model, a vent pipe would be provided at the narrow end (146) to create an updraft, with the air supply being fed down the pipe (126) as indicated by arrow (177).

A collection drawer (174) is supported above the floor of the housing (120) beneath the narrow end (146) and defines an isolated chamber to receive dry decomposing solid waste discharged through the opening (156) upon rotation of the aeration drum (132) in the direction required to open the flap (158) as described with reference to FIGS. 1–10. During such rotation, the flap (154) to the waste inlet opening (152) at the wide end is secured to a closed position so as not to discharge any solid waste into the housing (122). The drawer (174) is emptied periodically as described above with reference to the embodiment illustrated in FIGS. 1–10. An exit guide (176) attached to the housing adjacent the narrow end (146) of the aeration drum (132) channels the waste exiting the drum into the drawer (174).

It will be appreciated that the configuration of the aeration drum in accordance with the invention will allow the capacity of the unit to be maximized in the wide end and optimize space utilization inside the housing by disposing the fan, motor and collection drawer at the narrow end.

Extremely favourable conditions are provided for the separation of liquid waste from solid waste while maintaining a minimum moisture level required for decomposition. While the configuration of the aeration drum in accordance with the invention will find particular application in the decomposition of human waste matter, it will be understood that such conditions are equally favourable to the decomposition of other organic matter, notably vegetable matter conveniently discharged into the unit through the hatch (128). Such vegetable matter will conveniently supplement any human waste matter discharged into the unit via the pipe (126) but may equally well constitute the only waste supplied to the unit for decomposition.

Conditioners and accelerators are selectively added to the aeration drum through the hatch openings (128,129) in accordance with the optimum moisture requirements for aerobic decomposition.

It will be appreciated that the wide end (148) defines a moist chamber for decomposition and the narrow end (146) defines a dry chamber for decomposition while the drawer (174) defines an isolated chamber for final aerobic decomposition. The drawer (174) conveniently is heated through the floor of the housing above which it rests on supporting folds (179) and is exposed to moisture from the wet bottom and exposed to air which constantly circulates through the housing.

I claim:

1. In a composting unit comprising a housing and an aeration drum rotatably mounted for rotation about a longitudinal axis thereof oriented horizontally inside the housing, the aeration drum and the housing having cooperating access means for receiving human waste matter from a toilet remote from the unit and discharging said waste into the drum, solid waste discharge means for discharging decomposed solid waste matter, liquid waste discharge means in the aeration drum in fluid communication with the housing, and respective gas outlet means for ventilation and aeration of the aeration drum, the improvement in which the aeration drum has a narrow first end and a wide second end extending radially outwardly from said narrow first end, the liquid waste discharge means being disposed in said wide second end and the solid waste discharge means being disposed in said narrow first end for discharge of decomposed solid waste matter in a radial direction into the housing beneath said narrow first end of the drum where the decomposed solid waste matter is accommodated until periodically removed through withdrawal means provided in the housing, the configuration of said aeration drum being adapted to favour the separation of dried decomposed solid waste matter while maintaining a moist environment required for decomposition.

2. Composting unit according to claim 1 in which the narrow first end has a substantially constant first diameter over a predetermined first length of the drum, the wide second end has a substantially constant second diameter exceeding said first diameter over a predetermined second length of the drum, and the drum further includes an intermediate portion of variable diameter disposed between said narrow first end and said wide second end, said configuration of the aeration drum being adapted to favour the separation of dried decomposed solid waste matter while maintaining a moist environment required for decomposition.

3. Composting unit according to claim 2 in which said second length exceeds said first length.

4. In a composting unit comprising an aeration drum having access means for receiving waste matter, solid waste discharge means for discharging decomposed solid waste matter, and liquid waste discharge means for discharging liquid, the aeration drum being rotatably mounted for rotation about a longitudinal axis thereof oriented horizontally, the improvement in which the aeration drum has a narrow first end and a wide second end extending radially outwardly from said narrow first end, the narrow first end having a substantially constant first diameter over a first predetermined length of the drum, the wide second end having a substantially constant second diameter exceeding said first diameter over a predetermined second length of the drum, and the drum further including an intermediate portion of variable diameter disposed between said narrow first end and said wide second end, the liquid waste discharge means being disposed in the wide second end of the drum and the solid waste discharge means being disposed in said narrow first end.

5. Composting unit comprising a housing defining a first chamber for air circulation and the collection of liquids drained from decomposing waste, said housing having waste and air inlet means and air outlet means;

an aeration drum rotatably mounted for rotation about a longitudinal axis thereof oriented horizontally inside the housing, the aeration drum having waste inlet means disposed to receive waste discharged into the housing from said inlet means in the housing, and gas outlet means for discharging gas into the housing and the aeration drum having a narrow first end of substantially constant diameter and a wide second end of substantially constant diameter exceeding the diameter in the narrow first end and an intermediate portion of variable diameter disposed between said narrow first end and said wide second end of the drum, the wide second end defining a second chamber for wet decomposition of waste and having liquid discharge means in fluid communication with the housing, the narrow first end defining a third chamber for drier decomposition of waste and having solid waste discharge means; and a receptacle disposed in the housing beneath the narrow first end of the aeration drum to receive drier decomposing solid waste discharged from the aeration drum through said solid waste discharge means, said receptacle defining a fourth chamber for decomposition isolated from the other chambers and removable from the unit for periodic emptying upon completion of aerobic decomposition.

6. Composting unit according to claim 5 in which the aeration drum includes a perforated collar disposed on the intermediate portion and adapted to retain decomposing solid waste in the narrow first end while permitting liquid to drain into the wide second end.

7. Composting unit according to claim 5 in which the housing has respective openings for the addition of selected conditioners and accelerators to the wide second end of the aeration drum and to the narrow first end of the aeration drum.

8. Composting unit according to claim 5 in which the air outlet means in the housing is at the narrow first end of the aeration drum and the unit includes an electric fan for air circulation disposed inside the housing above the narrow first end of the aeration drum and communicating with said air outlet means.

9. Composting unit according to claim 5 in which the housing includes an electric motor for rotation of the aeration drum disposed above the narrow first end of the aeration drum.

* * * * *